Dec. 29, 1936.   G. J. OWENS   2,065,869
BEARING HOUSING FOR MOWERS AND THE LIKE
Filed Nov. 20, 1935

Inventor
George J. Owens
By C. A. Knowles.
Attorneys.

Patented Dec. 29, 1936

2,065,869

UNITED STATES PATENT OFFICE 2,065,869

BEARING HOUSING FOR MOWERS AND THE LIKE

George J. Owens, Philip, S. Dak.

Application November 20, 1935, Serial No. 50,766

1 Claim. (Cl. 74—579)

This invention relates to a bearing housing for use on farm mowers.

An object of the invention is to completely enclose the connection between the pitman and the operating crank or wrist pin and to use the enclosing housing as a case for holding a bearing whereby friction is reduced and the operating parts are rendered more lasting than heretofore.

With the foregoing and other objects in view which will appear as the description proceeds, the invention consists of certain novel details of construction and combination of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
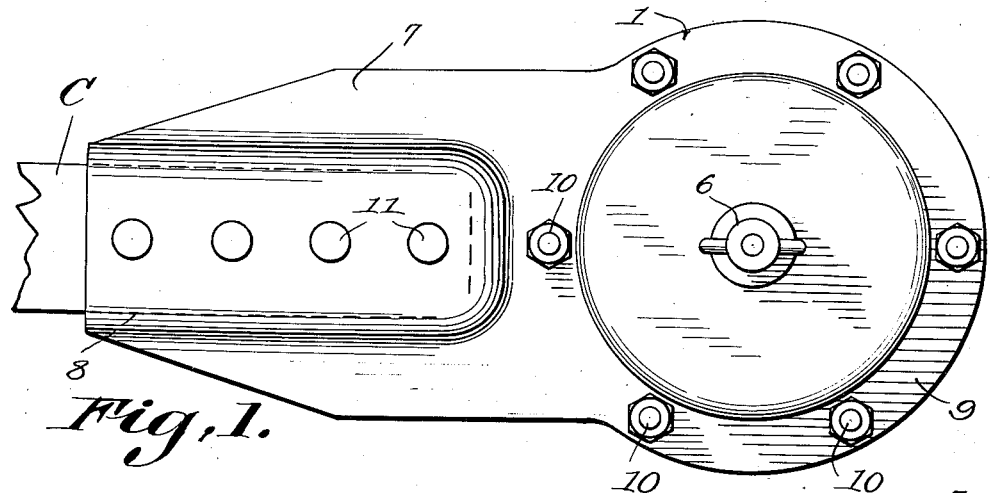
Figure 1 is a front elevation of the housing in position on a pitman.
Figure 2:
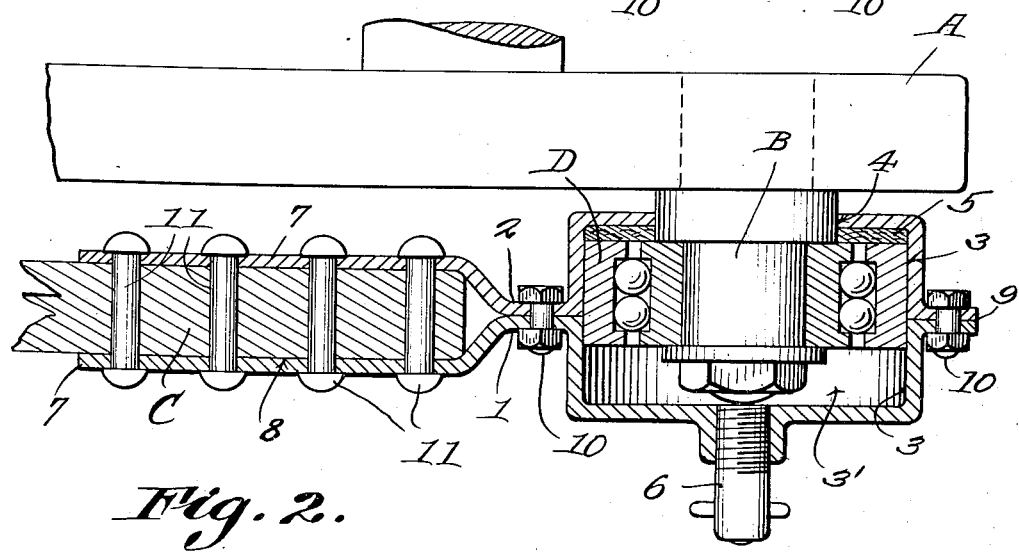
Figure 2 is a horizontal section, the wrist pin and a portion of the crank wheel being shown in plan.

Referring to the figures by characters of reference A designates the usual driving or crank wheel having a wrist pin B, and the wooden pitman has been indicated at C.

The housing comprises two opposed plates 1 and 2 each having a recess 3 pressed or otherwise formed therein. These recesses are adapted to coincide when the plates are placed one against the other and in the center of the wall of one recess is a circular opening 4 adapted to fit snugly about the wrist pin B. The chamber 3' formed by the matching recesses is of such size as to hold a suitable ball or roller bearing D of any standard type and a washer 5 can be arranged about the wrist pin and back of the bearing. Furthermore an inlet 6 for a lubricant can also be located in one wall of the chamber 3'.

The two plates 1 are so shaped as to provide wings 7 extending away from the recessed portions and having matching longitudinal recesses 8 for receiving snugly one end of pitman C, usually formed of wood.

Flanges 9 are located about the recesses 3 and are fastened together by bolts 10. Rivets 11 or the like can also be used for fastening the wings 7 to the pitman. It will be noted that the outer ring of the bearing D is in one piece and constantly extends across the joint between the opposed recessed portions of the plates 1 and 2. Thus the admission of foreign substances into the bearing is prevented by this outer ring of bearing D which serves as a guard or baffle. It will be noted further that the housing made up of the opposed recessed portions of the plates cannot slide axially of the bearing because of the packing 5 interposed between the bearing and one side of the housing and the close proximity of the other side of the housing to the end of the wrist-pin.

The described housing constitutes a cheap but effective connection between the wrist-pin and pitman and is advantageous also because it is easy to apply and provides complete protection for the bearing.

It will be noted that the end of the wrist pin B and one side of the bearing D cooperate with the housing to hold it against lateral displacement.

What is claimed is:

The combination with the sickle pitman and crank wheel of a mower, said wheel having a wrist-pin, of opposed plates contacting at their inner sides and having matching recesses forming a chamber housing the wrist-pin, wings integral with the plates having matching recesses in which one end of the pitman is seated, an anti-friction bearing on the wrist-pin and enclosed in the chamber, said bearing including an outer ring constantly bridging the joint between the meeting faces of the plates to exclude foreign substances from between the plates, means for fastening the plates together, certain of said means extending through the pitman to fasten it to the plates, one side of the bearing and one end of the wrist-pin cooperating with the respective plates to hold the housing and wrist-pin against relative lateral displacement.

GEORGE J. OWENS.